Oct. 16, 1951 N. O. BRODERSON 2,571,193
MOLDING PLASTIC ARTICLES
Filed May 18, 1950
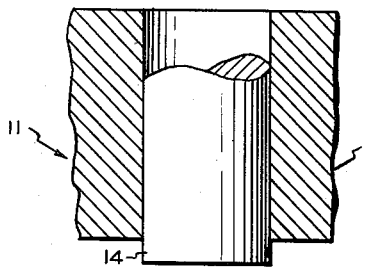
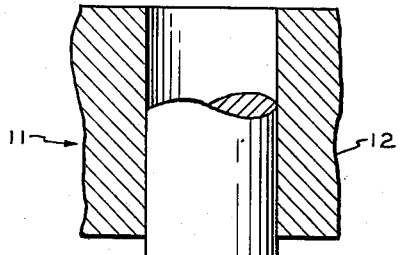
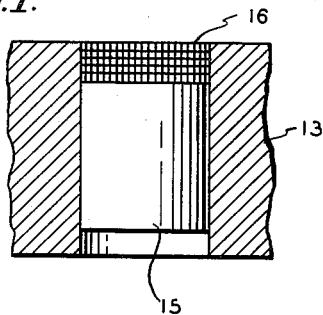
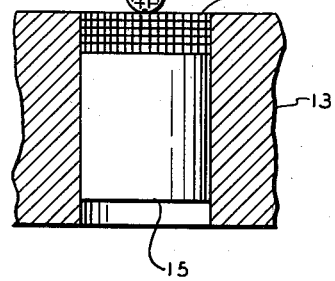
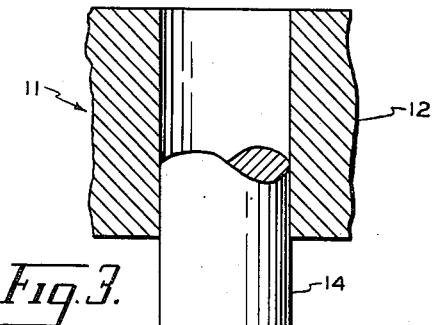
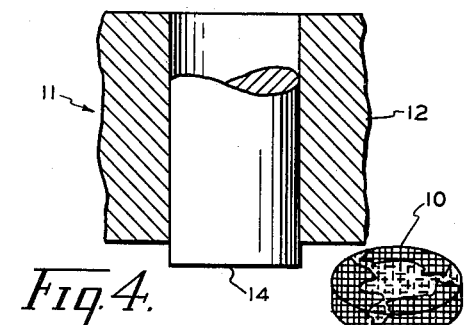
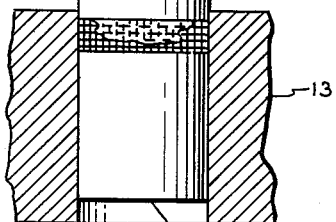
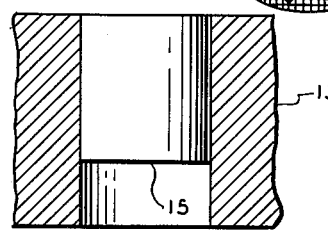
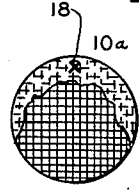
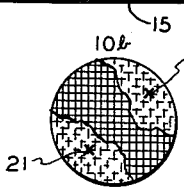
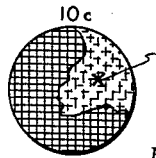
INVENTOR
NEIL O. BRODERSON
BY Stowell & Evans
ATTORNEY

UNITED STATES PATENT OFFICE 2,571,193

MOLDING PLASTIC ARTICLES

Neil O. Broderson, Rochester, N. Y., assignor to Rochester Button Company, Rochester, N. Y., a corporation of New York Application May 18, 1950, Serial No. 162,678

6 Claims. (Cl. 18—48.8)

This invention relates to the manufacture of molded articles from plastic substances, and particularly to the production of molded articles having a mottled, variegated, veined or marbled appearance. The invention is particularly useful in the production of buttons and similar molded articles having the appearance of natural horn or bone, nuts and the like both as to color variations as well as to natural grain or structure such as found in the annual rings in horn and ivory.

It is, therefore, a principal object of the invention to provide a method whereby the finer markings of natural materials may be inexpensively and simply reproduced in molded plastic articles, such as buttons.

A further object of the invention is the provision of such a method whereby the variegated, veined or mottled effect in the article to be produced may be varied both as to color and configuration without the necessity of changing the molding apparatus or machinery.

Other objects and advantages of the invention will be apparent from the following description of the invention.

I have found that highly satisfactory color design variegations on molded articles may be produced by impressing into the surface of a molding composition, for example, a molding powder, during the blanking or preforming process, one or more hardened frangible pills of material differing in color from the molding composition, in such a manner that the colored pills are crushed into the molding material. The term differing in color is intended to include differences in hue, brightness, transparency or saturation. The mottled effect thereby produced in the preformed blank is effectively controlled by and dependent upon the color, size, shape and number of the frangible pills and on their position in the preforming die. The blank may then be cured or subjected to a thermo-molding operation depending upon the particular plastic composition used, or the preformed blank may be further treated before the curing or hot pressing operation by color stenciling or by topically graining its surface.

The invention will be more particularly described for the purpose of illustration, as applied to the production of buttons, the invention however not being limited to any particular article, but on the contrary being equally adaptable to the molding of various articles such as beads, knobs, ashtrays, and containers, and with reference to the accompanying drawings in which:

Figs. 1 through 4 show diagrammatically the steps in preform molding in accordance with the principles of the invention; and Figs. 5 through 7 are plan views of preformed blanks for buttons having mottled or variegated appearance as produced by this invention.

In Fig. 1 the preforming die is shown charged with molding composition;

Fig. 2 shows the next stage, in which the frangible colored pill has been supplied to the die;

In Fig. 3 the powders and the frangible pill have been compressed by the die plunger; and Fig. 4 shows the next stage wherein the finished blank is ejected from the preforming die.

The button blanks 10, 10a, 10b, and 10c as shown in Figs. 4, 5, 6, and 7 respectively, are formed, preferably by a cold-pressing operation, from any plastic composition suitable for the production of buttons, for example, one of the urea-formaldehyde resinous compositions capable of hardening under the influence of heat and pressure to a hard, durable molded article. The preforming die 11 shown diagrammatically by way of illustration comprises an upper and lower body 12 and 13, and movable upper and lower platens or plungers 14 and 15 slidably secured in the upper and lower die bodies respectively. 16 is the molding composition from which the button blank is formed and may be of any desired color and may be placed in the die in layers of different colors as is well known in the art, or other known methods may be utilized in charging the preforming die with molding composition in conjunction with the method of this invention without departing from its principle of operation.

Prior to the compressing of the molding material 16 by plunger 14 a hardened frangible pill 17, which may be of molding material, is placed upon the uncompressed powders 16. This frangible pill may be of any desired color, or mixture of colors depending upon the color array desired in the button blank. The pill 17 is shown by way of illustration as a spherical pill of contrasting color to that of the molding powder 16, and as being positioned centrally of the die. The next stage is the compression of the molding material and frangible pill into a blank as shown in Fig. 3 of the drawings, during which the pill 17 is cracked, and broken and caused to penetrate into and spread through the powder 16. The degree to which the pill is broken up and the extent to which its fragments are imbedded into the molding material depends among other things upon the shape and size of the pill and its hardness in relation to the molding material.

In the illustrative example shown in Figs. 1 through 4, the frangible pill 17 is placed centrally of the die as hereinbefore stated and therefor the button blank 10 has a predominance of "pill color" and a greater degree of fragment penetration at its center as clearly shown in Fig. 4.

The button blanks shown in Figs. 5, 6, and 7 show the various mottled effects obtainable by varying the position of the frangible pill only. The frangible pills being located at 18 and 19 in blanks 10a and 10c while in blank 10b two pills were employed one at 20 and the other at 21. Other and various pattern effects may be obtained through the employment of cubical or cylindrical pills, in which case a greater proportion of the fractured pill fragments would spread out over the surface of the molding material than would penetrate below the surface in contrast to the spreading out and penetration of a spherical pill shown by way of illustration in the drawings.

When articles having simulated natural grain or structure such as found in the annual rings in horn and ivory are desired the upper or lower platens 14 and 15 or both may have a relief pattern thereon corresponding to the graining or surface texture of the desired product whereby during the die compression stage of the process blanks are formed with topically distributed impressions in their surfaces.

After the preforming operation above described the finished blank may either be stored or subjected to a final molding operation suitable to the particular plastic substance of which the blank is made.

In general, any of the known types of plastics are suitable for practicing the invention, including for example, the thermo-setting type of plastics such as urea-formaldehyde, and phenol formaldehyde condensation products, and the thermoplastic type such as casein compositions, cellulose acetate compositions and vinyl resin compositions.

It will be evident that various modifications may be made in the method of the invention. For example the invention is not limited to the positioning of at least one hardened frangible pill on the surface of the molding powder but the pills may be placed in the preform die before the introduction of the molding powder or pills may be used in both positions when color design variegations are desired on both sides of the article to be produced.

From the foregoing description it will be seen that the present invention provides a novel method of constructing molded products whereby the aims, objects, and advantages of the invention are fully accomplished.

I claim:

1. A method of making articles of variegated color which comprises placing in a die a body of powdered material to be molded and at least one frangible pill differing in color from the body material, said pill having substantially less cross-sectional area than the body material, subjecting the materials in the die to pressure whereby the body material is compressed and the frangible pill is fractured and caused to penetrate into and spread in localized areas only of said body material, and thereafter subjecting the compressed material to indurating conditions.

2. A method of making variegated articles which comprises placing in a die a body of powdered material to be molded and at least one frangible sphere of a moldable material differing in color from the body material, said sphere having substantially less cross-sectional area than the body material, subjecting the materials in the die to pressure whereby the body material is compressed and the frangible sphere is fractured and caused to penetrate into and spread in localized areas only of said body material, and thereafter subjecting the compressed material to indurating conditions.

3. A method of molding a preform of variegated color which comprises placing in a die a powdered plastic composition and at least one frangible moldable pill of the same composition but differing in color from said powdered plastic composition, said pill having substantially less cross-sectional area than the powdered plastic composition, and then subjecting the materials in the die to pressure whereby the powdered plastic composition is compressed and the frangible pill is fractured and caused to penetrate into and spread in localized areas only of said powdered plastic composition to form a moldable blank of variegated color.

4. A method of molding a preform of variegated color which comprises placing in a die a body of powdered material to be molded and at least one frangible pill of molding material differing in color from the body material, said pill having substantially less cross-sectional area than the body material, subjecting the materials in the die to pressure whereby the body material is compressed and the frangible pill is fractured and caused to penetrate into and spread in localized areas only of said body material to form a moldable blank of variegated color.

5. A method of molding articles of variegated color which comprises placing in a die a body of powdered thermo-plastic composition and at least one frangible pill of molding material differing in color from said body, said pill having substantially less cross-sectional area than the said body and then subjecting the body and the frangible material to pressure and heat whereby the powdered thermo-plastic composition is compressed and the frangible pill fractured and caused to penetrate into and spread in localizing areas only of said body and the materials are molded to form an article having variegations in color.

6. A method of molding articles of variegated color which comprises placing in a die a body of powdered thermo-setting composition and at least one moldable pill of a frangible material differing in color from said body, said pill having substantially less cross-sectional area than the body material and then subjecting the materials in the die to heat and pressure whereby the thermo-setting composition is compressed and the frangible pill is fractured and caused to penetrate into and spread in localized areas only of said body material, and the materials are molded to form an article having variegations in color.

NEIL O. BRODERSON.

REFERENCES CITED

The following references are of record in the file of this patent:

UNITED STATES PATENTS

| Number | Name | Date |
|---|---|---|
| 1,920,120 | Woodruff | July 25, 1933 |